(No Model.)
W. H. FLINN.
KNOB ATTACHMENT.
No. 379,639. Patented Mar. 20, 1888.
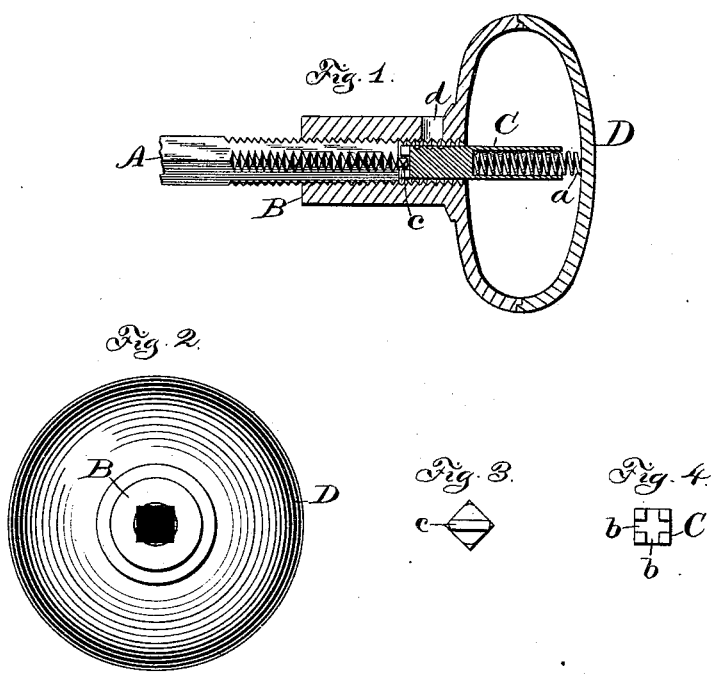
Witnesses.
John Edwards Jr.
W. H. Whiting.
Inventor.
William H. Flinn.
By James Shepard.
Atty.

United States Patent Office.

WILLIAM HENRY FLINN, OF NASHUA, NEW HAMPSHIRE, ASSIGNOR TO THE RUSSELL & ERWIN MANUFACTURING COMPANY, OF NEW BRITAIN, CONNECTICUT.

KNOB ATTACHMENT.

SPECIFICATION forming part of Letters Patent No. 379,639, dated March 20, 1888.

Application filed April 11, 1887. Serial No. 234,334. (No model.)

*To all whom it may concern:*

Be it known that I, WILLIAM HENRY FLINN, a citizen of the United States, residing at Nashua, in the county of Hillsborough and State of New Hampshire, have invented certain new and useful Improvements in Knob Attachments, of which the following is a specification.

My invention relates to improvements in knob attachments of the class in which the corners of the square spindle and hole in the knob-shank are threaded; and the objects of my invention are convenience in attaching the knob, nicety of adjustment, and efficiency of the parts when adjusted.

In the accompanying drawings, Figure 1 is an axial section, partly in elevation, of my knob attachment. Fig. 2 is an end view of the knob; Fig. 3, an end view of the spindle; Fig. 4, an end view of the fastening-slide.

The knob may be secured to one end of the spindle in any ordinary manner, so as to be rigid therewith, while my attachment is applied to that end of the spindle whose knob will be lastly secured to the door.

A designates one end of the spindle, having its corners threaded, but leaving the corners at the highest point of the thread, so as to form substantially a full square when the spindle is viewed in end view. The knob-shank B is first formed with a square hole of a size that will substantially fit the square spindle A, and is then tapped or threaded to correspond with the threaded corners of the spindle. The spindle so fitted to the knob-shank may be slipped longitudinally through the shank when the square hole therein registers with the square of the spindle, and when it is turned one-eighth of a revolution and the threads engage, it is firmly locked against longitudinal movement, so that it cannot be pulled off without first giving the knob a partial revolution. In order to lock the knob and spindle against axial rotation, I employ a spring-pressed slide, C, which is square in cross-section and of a size corresponding with the spindle A, which slide I arrange so as to move freely within the knob end of the knob-shank, as shown in Fig. 1. In one end I form a socket for the spring *a*, one end of which spring rests against the inner face or shell of the knob D, so as to force said slide toward the spindle A. The other end of this slide C is provided with sockets in the form of cross-slots *b*, Fig. 4, which are adapted to receive the lip or projection *c* on the confronting end of the spindle A, thus locking the parts together at each quarter of a revolution of one of them. This is the preferred form for the engaging ends of the knob-spindle and slide; but it is evident that the projection and sockets might change places without materially changing the construction.

The form of knob-shank shown in Fig. 1 is designed to pass through the knob rose or escutcheon and have its end rest upon the side of the spindle-hub or the lock-case, as in many ordinary locks. In order to attach the knob after the spindle is inserted in the latch, the knob-shank is slipped longitudinally upon the threaded end of the knob-spindle until its end strikes the latch-case. If the threads then match, the knob is turned axially one-eighth of a revolution, when the spring *a* pushes the slide C against the end of the knob-spindle, with the projection engaging one of the sockets of the slide, thereby holding the knob against axial rotation, while the engaging threads of the spindle and knob prevent the knob from being pulled off. In this construction it should be noticed that the projection *c* extends diagonally across the end of the knob-spindle, while the cross grooves or sockets *b b* are parallel with the respective sides of the knob-spindle. Thus it will be seen that, the slide C being fitted to and always coincident with the square hole of the knob-shank, the slide and spindle can be locked together only when the threaded corners of the spindle are within the threaded side walls of the hole in the knob-shank. If when the knob is first placed upon the spindle it is found, on attempting to turn it, that the threads do not register, it may be drawn back a little, turned a quarter of a revolution, and again pressed forward against the side of the latch-case, which operation may be repeated until the knob-shank is in position with its end against the side of the latch-case and with the threads registering. Then, turning the knob one-eighth of a revolution, the locking-slide will snap into proper engagement with the spindle. By locating the lug and sockets so that the parts lock together at each quarter of a revolution, a closer adjustment can be made than with prior knob attachments which lock in only one position. In order to detach the knob it is only necessary to insert the end of a scratch-awl or other convenient implement in the orifice $d$ in the knob-shank and press the slide C back sufficiently to disengage the holding projection $c$, then turn the knob one-eighth of a revolution, and it will be free to be pulled off from the spindle. If desired, in order to facilitate thus pushing back the slide, it may be slightly roughened or provided with small holes upon the side which is opposite the orifice $d$, as shown; or said orifice may be made of such size and position as to come opposite the meeting ends of the knob-spindle and slide, so that an instrument may reach the end of the slide for pressing it back.

I claim as my invention—

1. The herein-described knob attachment, consisting of the angular spindle with threaded edges and the angularly-mortised knob-shank, with the side walls of the mortise threaded to correspond with the threaded edges of said spindle, in combination with the spring-actuated slide, said slide and spindle being provided, respectively, with engaging sockets and projection, with their engaging positions at one-eighth the way around from each flat side of the square spindle, whereby the parts are locked against independent rotation at each eighth of a revolution of the spindle after it is inserted in the knob shank, all substantially as described, and for the purpose specified.

2. In a knob attachment, the combination of the threaded angular spindle and the angularly-mortised knob-shank with the square slide C, fitted in the axial hole of the shank, and the spring $a$, pressing upon said slide, the ends of said spindle and slide being provided, respectively, with an engaging projection and socket, substantially as described, and for the purpose specified.

WILLIAM HENRY FLINN.

Witnesses:
W. A. FARLEY,
A. J. McKEAN.